(12) United States Patent
Palmer et al.

(10) Patent No.: US 11,157,404 B2
(45) Date of Patent: Oct. 26, 2021

(54) REMAPPING TECHNIQUES FOR A RANGE OF LOGICAL BLOCK ADDRESSES IN A LOGICAL TO PHYSICAL TABLE OF NAND STORAGE

(71) Applicant: Micron Technology, Inc., Boise, ID (US)

(72) Inventors: David Aaron Palmer, Boise, ID (US); Nadav Grosz, Broomfield, CO (US)

(73) Assignee: Micron Technology, Inc., Boise, ID (US)

( * ) Notice: Subject to any disclaimer, the term of this patent is extended or adjusted under 35 U.S.C. 154(b) by 100 days.

(21) Appl. No.: 16/552,246

(22) Filed: Aug. 27, 2019

(65) Prior Publication Data
US 2021/0064526 A1    Mar. 4, 2021

(51) Int. Cl.
*G06F 12/08* (2016.01)
*G06F 3/06* (2006.01)

(52) U.S. Cl.
CPC ............ *G06F 12/08* (2013.01); *G06F 3/0604* (2013.01); *G06F 3/0655* (2013.01); *G06F 3/0679* (2013.01)

(58) Field of Classification Search
CPC ...... G06F 12/08; G06F 3/0655; G06F 3/0679; G06F 3/0604; G06F 3/0656; G06F 3/0608; G06F 3/064; G06F 2212/7204; G06F 12/0246; G06F 2212/7201; G06F 2212/7203; G06F 2212/7208; G06F 2212/1016; G06F 2212/1056
USPC .......................................... 711/206, 202, 103
See application file for complete search history.

(56) References Cited

U.S. PATENT DOCUMENTS

| | | | |
|---|---|---|---|
| 2012/0272038 A1* | 10/2012 | Wei | G06F 3/0647 711/206 |
| 2013/0173931 A1* | 7/2013 | Tzafrir | G06F 21/79 713/193 |
| 2014/0189211 A1* | 7/2014 | George | G06F 3/0613 711/103 |
| 2014/0215125 A1* | 7/2014 | Sela | G06F 3/0652 711/103 |
| 2017/0139827 A1* | 5/2017 | Crossland | G06F 12/0638 |
| 2018/0357160 A1* | 12/2018 | Gorobets | G06F 3/0613 |
| 2020/0356295 A1* | 11/2020 | Shen | G06F 3/0674 |

\* cited by examiner

*Primary Examiner* — Hong C Kim
(74) *Attorney, Agent, or Firm* — Schwegman Lundberg & Woessner, P.A.

(57) ABSTRACT

Devices and techniques are disclosed herein for remapping data of flash memory indexed by logical block addresses (LBAs) of a host device in response to re-map requests received at a flash memory system from the host device or in response to re-map requests generated at the flash memory system.

13 Claims, 7 Drawing Sheets

REMAPPING TECHNIQUES FOR A RANGE OF LOGICAL BLOCK ADDRESSES IN A LOGICAL TO PHYSICAL TABLE OF NAND STORAGE

BACKGROUND

Memory devices are typically provided as internal, semiconductor, integrated circuits in computers or other electronic devices. There are many different types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory cells are typically arranged in a matrix or an array. Multiple matrices or arrays can be combined into a memory device, and multiple devices can be combined to form a storage volume of a memory system, such as a solid-state drive (SSD), a Universal Flash Storage (UFS™) device, a MultiMediaCard (MMC) solid-state storage device, an embedded MMC device (eMMCT™), etc.

A memory system can include one or more processors or other memory controllers performing logic functions to operate the memory devices or interface with external systems. The memory matrices or arrays can include a number of blocks of memory cells organized into a number of physical pages. The memory system can receive commands from a host in association with memory operations, such as read or write operations to transfer data (e.g., user data and associated integrity data, such as error data and address data, etc.) between the memory devices and the host, erase operations to erase data from the memory devices, or perform one or more other memory operations.

Memory is utilized as volatile and non-volatile data storage for a wide range of electronic applications, including, for example, personal computers, portable memory sticks, digital cameras, cellular telephones, portable music players such as MP3 players, movie players, and other electronic devices. Memory cells can be arranged into arrays, with the arrays being used in memory devices.

Many electronic devices include several main components: a host processor (e.g., a central processing unit (CPU) or other main processor); main memory (e.g., one or more volatile or non-volatile memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, or combination of volatile and non-volatile memory, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Flash memory-based storage devices such as NAND memory can use a Flash Translation Layer (FTL) to translate logical addresses of I/O requests, often referred to as logical block addresses (LBAs), to corresponding flash memory addresses which are stored in one or more mapping tables sometimes referred to as logical-to-physical map (L2P) tables. LBAs can be the logical addresses used by a host for managing data. Mobile storage devices typically have a cache with constrained size, and thus often lack memory to store an entire mapping table. Therefore, portions of the mapping table(s) can be retrieved from the flash memory on demand, which can cause random read performance degradation.

In order to improve random read performance, techniques have been developed to enable use of host-resident memory, in addition to memory cells of a memory device coupled to the host, as a cache for a L2P table. Under a host-resident FTL, FTL data can be read from host memory faster than from flash memory, and the host can initiate a memory operation by retrieving a physical address (PA) of the flash memory and including the PA in a memory request to the flash memory. The PA can be retrieved by the host using the FTL memory cache of the host and the LBA of the host. Upon receiving the memory request, the flash memory system can immediately retrieve the data associated with the physical address without the delay associated with accessing the flash memory-based mapping table and using the LBA to obtain the physical address.

In certain implementations of a host-resident FTL, improvements in random read workload performance can be significant. In addition to techniques for implementing host-resident FTL, some specialized file-system based host-resident FTL techniques have been developed that take into account the operating nuances specific to flash memory. Whether specialized or not, implementations of host-resident FTL, can become inefficient over time as invalid data throughout the LBA layout can increase latency of reading and writing data. Such inefficiencies can be cured by remapping data associated with the LBA layout to align the data with corresponding files of the host device and to remove or minimize invalid data within LBAs having valid data.

Figure 1:
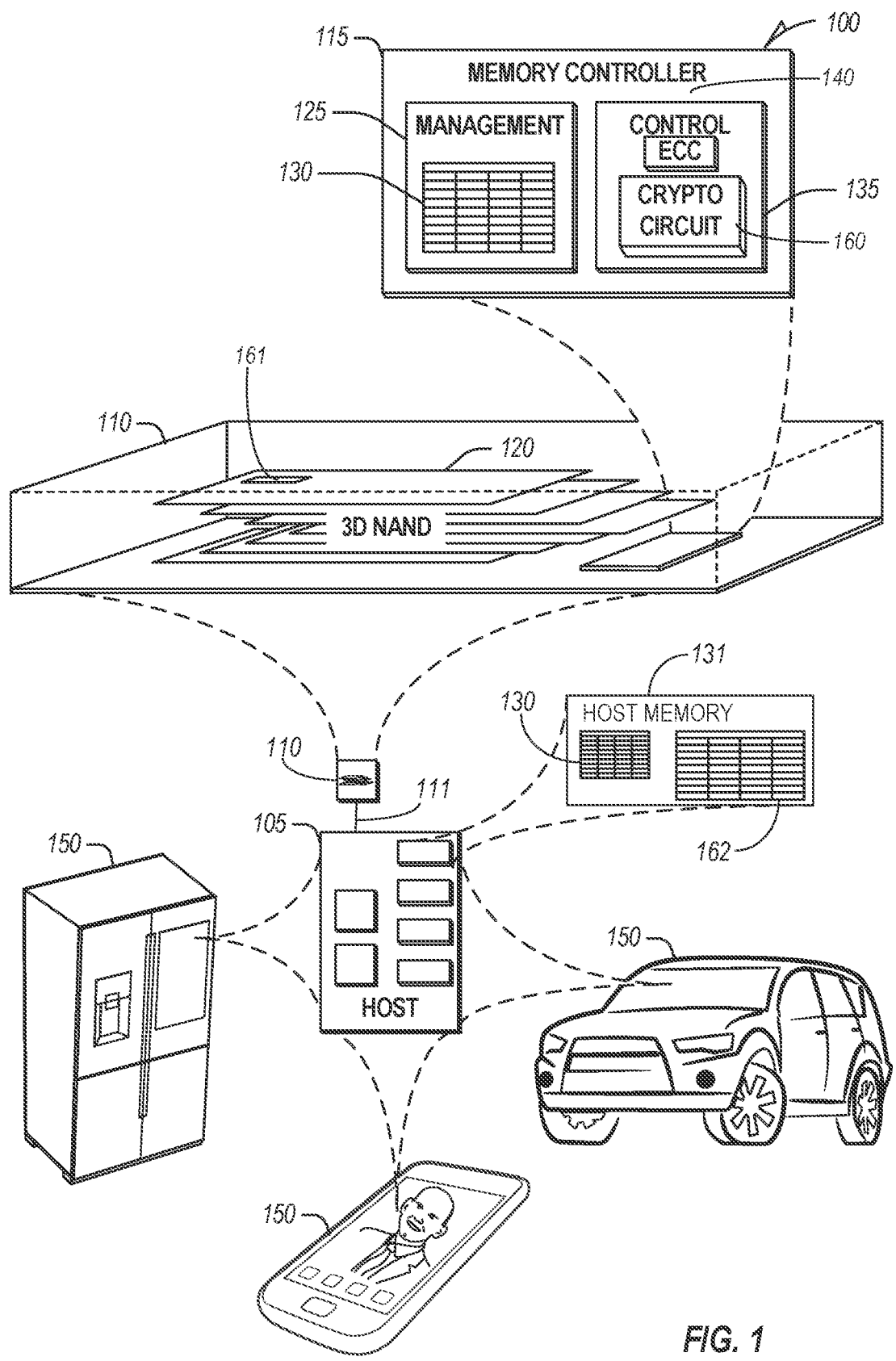
FIG. 1 illustrates an example system an environment including a memory device upon which one or more examples of the present subject matter may be implemented.

FIG. 1 illustrates an example of an environment 100 including a host 105 and a memory device 110 configured to communicate over a communication interface. The host 105 or the memory device 110 may be included in a variety of products 150, such as IoT devices (e.g., a refrigerator or other appliance, sensor, motor or actuator, mobile communication device, automobile, mobile phone, drone, etc.) to support processing, communications, or control of the product 150.

The memory device 110 includes a memory controller 115 and a memory array 120 including, for example, one or more individual memory die (e.g., a stack of three-dimensional (3D) NAND die). In 3D architecture semiconductor memory technology, vertical structures are stacked in multiple tiers, and coupled to form physical pages, to increase the storage density of a memory device (e.g., a storage device) in a given footprint (i.e. form factor). In an example, the memory device 110 can be a discrete memory device. In certain examples, one or more memory die of the memory array 120 can include a first complete FTL table 161, or L2P table, for mapping logical block addresses of the host with physical addresses of the flash memory.

One or more communication interfaces 111 can be used to transfer data between the memory device 110 and one or more other components of the host 105, such as a Serial Advanced Technology Attachment (SATA) interface, a Peripheral Component Interconnect Express (PCIe) interface, a Universal Serial Bus (USB) interface, a UFS interface, an eMMC™ interface, or one or more other connectors or interfaces. The host 105 can include a host system, an electronic device, a processor, a memory card reader, or one or more other electronic devices external to the memory device 110. In some examples, the host 105 may be a machine having some portion, or all, of the components discussed in reference to the machine 700 of FIG. 7. Data may be transferred between the memory device 110 and other components over an input/output (I/O) bus that may include one or more latches for temporarily storing the data as it is being transferred (e.g., before being read or written from/to a memory array).

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, control circuitries, or components configured to control access across the memory array 120 and to provide a translation layer between the host 105 and the memory device 110. The memory controller 115 can include one or more I/O circuits (and corresponding latches), caches, lines, or interfaces to transfer data to or from the memory array 120. The memory controller 115 can include a memory manager 125 and an array controller 135.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. ECC component 140, for example, may detect or compute a bit-error-rate (BER) associated with performing a number of memory operations. The BER may correspond to bit errors occurring in latches of an I/O bus, internal errors of memory controller 115, errors occurring in one or more of the NAND arrays, or any one or more of the multi-level cell(s) (MLC) of the memory device 110. The memory controller 115 can be configured to actively detect and recover from error occurrences (e.g., bit errors, operation errors, crash conditions, stalls, hang ups, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors. Array controller 135 may transmit detected BER information to memory manager 125 for storage and tracking. The memory controller 115 may include a command queue (not shown) that tracks memory commands received from a host. Commands in the queue may be executed by memory controller 115 in a first-in first-out (FIFO) manner, stack manner, out of sequence, according to priority, or in any other suitable order.

In certain examples, the memory device 110 may include cryptography circuitry in association with the memory array 120. In certain examples, the cryptography circuitry can include an encryption circuit, a decryption circuit, or a combination thereof. In some implementations, memory controller 115 of memory device 110 may include control circuitry configured to implement the functions of the cryptography circuit. In other implementations, the cryptography circuit may include an independent control circuitry for implementing the described functionality. In yet other implementations, control circuitry may be divided between the cryptography circuit and memory controller 115 to implement the described functions of the cryptography circuit. In the depicted example, the array controller 135 forms a portion of the memory controller 115, and the cryptography circuit 160 forms a portion of the array controller. In other implementations, cryptography circuit 160 may be external, and/or outside of array controller 135. For example, the cryptography circuit 160 (or any individual components thereof), may be an independent component coupled to one or more components in environment 100. However physically located, the structures providing the additional functionality of the cryptography circuit 160, function to verify physical addresses provided by the host 105 to prevent erroneous or malicious access to the memory device and to provide opportunities for the host to refresh the host-resident mapping table information to align the mapping information with the mapping information of the memory device during host-resident FTL operation of the environment 100.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection (e.g., BER monitoring) or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory array 120 can include multiple memory cells arranged in, for example, a number of devices, planes, sub-blocks, blocks, or pages. As one example, a 48 GB TLC NAND memory device can include 18,592 bytes of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a MLC NAND flash device may have a higher bit error rate than a corresponding single-level cell (SLC) NAND flash device. As such, the MLC device may require more metadata bytes for error data than the corresponding SLC device.

In certain examples, the host can include a second memory 111. In certain examples, the second memory 111 is not a flash-type memory device, but a type of memory having faster access times than flash-type memory. In certain examples, the second memory 111 can be used to store and maintain a set of management tables 130. The management tables can include various information associated with one or more components of the memory device 110 (e.g., various information associated with a memory array or one or more memory cells coupled to the memory controller 115 and can include an FTL table). For example, the management tables 130 can include information regarding FTL mapping information, block age, block erase count, error history, error parameter information, host reset timeout value, memory operation command latencies, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts (e.g., an error parameter) is above a threshold (e.g., an allowable error threshold), the bit error can be referred to as an uncorrectable bit error. The management tables 130 can maintain a count of correctable or uncorrectable bit errors, among other things. In certain examples, the second memory can include a second complete FTL table 162 for mapping logical block addresses of the host with physical addresses of the flash memory.

The present inventor has recognized that techniques for flash memory systems for efficient LBA remapping. As discussed above, LBA re-mapping can maintain operation of the system at a high level by reducing latencies that creep up when the LBA layout develops holes of invalid data. Conventional methods of re-mapping include reading data from the storage system back to the host, arranging the data more efficiently at the host, and then re-writing the data back to the storage system. The present inventor has recognized that the memory controller can assist to provide more efficient LBA remapping by not requiring the data associated with LBA remapping operations to be transferred between the host and the memory system. Such techniques are applicable to flash memory systems that employ host-resident FTL and to flash memory systems that do not employ host resident FTL. In certain examples, the memory system can be responsive to one or more LBA remapping commands provided by the host device. In some examples, the memory system can generate or initiate LBA remapping operations without receiving an LBA remapping command from a host.

Figure 2:
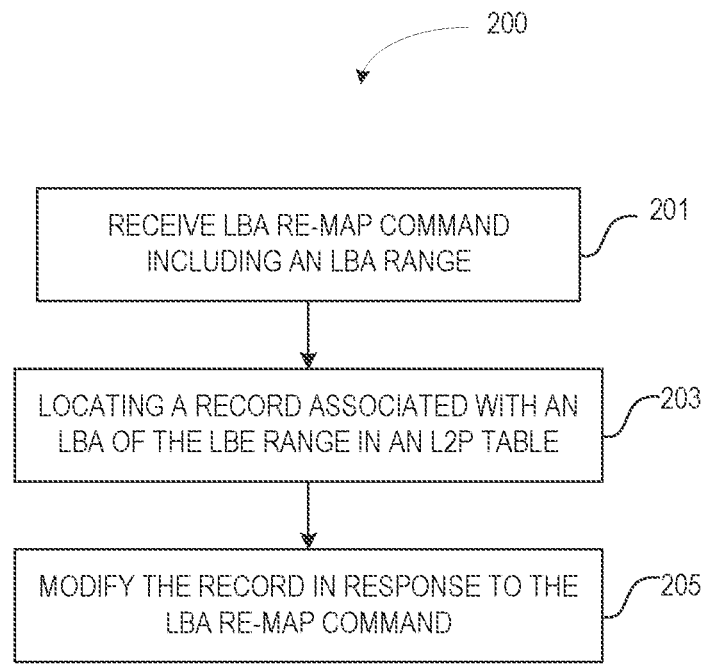
FIG. 2 illustrates generally a flowchart of an example method for operating a storage device in response to a LBA re-map request.

FIG. 2 illustrates generally a flowchart of an example method 200 for executing an LBA remap request at a flash storage system. At 201, a controller of the flash storage system can receive a LBA remap command from a host device. The remap command can include one or more LBA ranges. At 203, the flash storage system can locate one or more records of a L2P table of the flash storage system corresponding to one or more LBAs of the LBA range. At 205, the controller can modify one or more of the identified records of the L2P table to at least partially execute the LBA remap request. In certain examples, the LBA remap request can be executed without exchanging the data associated with the LBA range with the host device. In certain examples, the flash storage system can provide status information about execution of the LBA remap request in response to receiving the LBA remap request. In certain examples, an LBA remap request can include one or more commands such as, but not limited to am LBA move command, and LBA copy command, or combination thereof.

Figure 3:
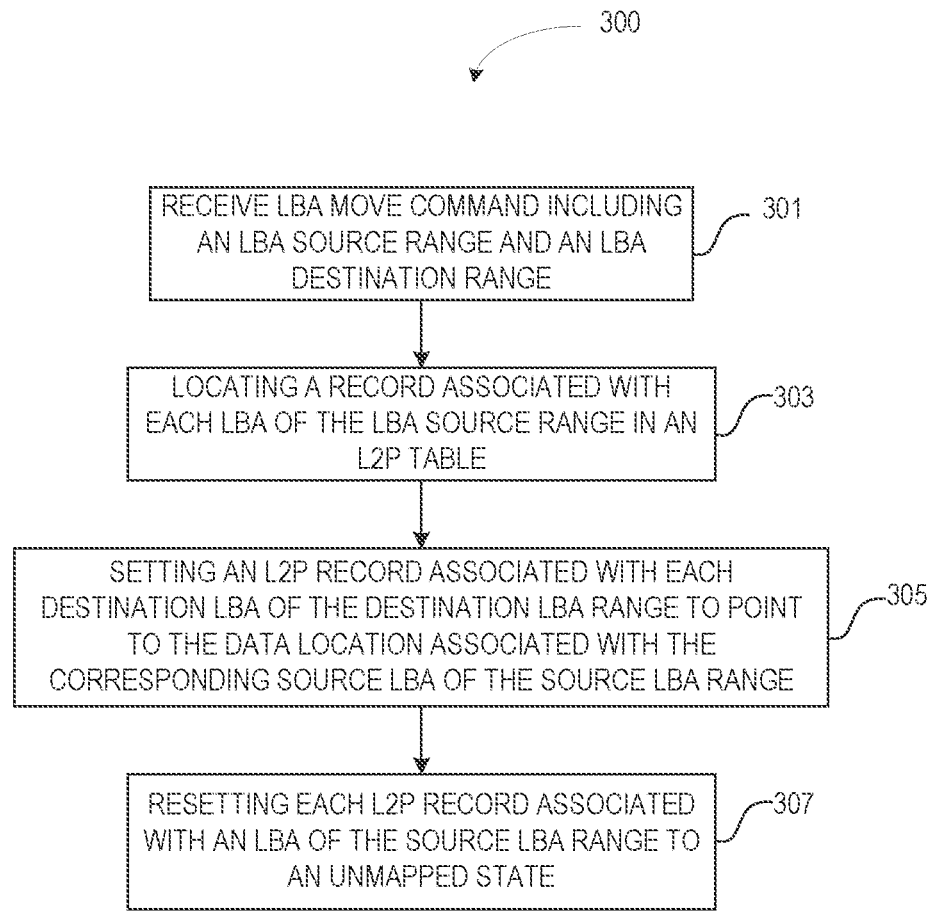
FIG. 3 illustrates generally a flowchart of an example method for operating a storage device in response to a LBA move command.

FIG. 3 illustrates generally a flowchart of an example method 300 for executing a LBA move command. At 301, a controller of the flash storage system can receive a LBA move command from a host device. The LBA move command can include one or more LBA ranges, such as a source LBA range and a destination LBA range. At 303, the flash storage system can locate one or more records of a L2P table of the flash storage system corresponding to one or more LBAs of the source LBA range. In certain examples, the flash storage system can also locate one or more records of the L2P table corresponding to one or more LBAs of the destination LBA range. At 305, the controller can modify one or more of the identified records of the L2P table corresponding to the destination L2P range with the physical address of a corresponding record associated with an LBA of the source LBA range. In certain examples, after modification a record associated with a source LBA of the source LBA range can include the same physical address in the record associated with the corresponding destination LBA of the destination LBA range. At 307, each L2P record associated with the LBAs of the source LBA range can be reset to an unmapped state. In certain examples, an LBA move command can be executed via manipulation of only the L2P table and not reading or writing any of the underlying stored data, and also without exchanging any of the underlying stored data with the host.

Figure 4:
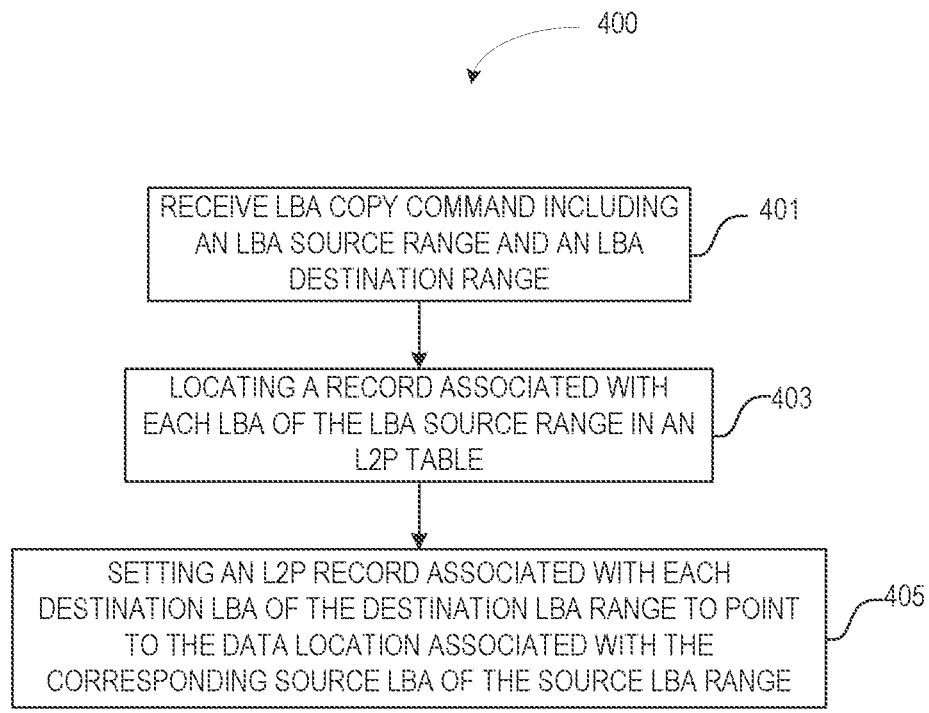
FIG. 4 illustrates generally a flowchart of an example method for operating a storage device in response to a LBA copy command.

FIG. 4 illustrates generally a flowchart of an example method 400 for executing a LBA copy command. At 401, a controller of the flash storage system can receive a LBA copy command from a host device. The LBA copy command can include one or more LBA ranges, such as a source LBA range and a destination LBA range. At 403, the flash storage system can locate one or more records of a L2P table of the flash storage system corresponding to one or more LBAs of the source LBA range. In certain examples, the flash storage system can also locate one or more records of the L2P table corresponding to one or more LBAs of the destination LBA range. At 405, the controller can modify one or more of the identified records of the L2P table corresponding to the destination L2P range with the physical address of a corresponding record associated with an LBA of the source LBA range. In certain examples, after modification a record associated with a source LBA of the source LBA range can include the same physical address in the record associated with the corresponding destination LBA of the destination LBA range. In certain examples, the copy method 400 of FIG. 4 can be referred to as a shallow copy as the data represented by the source LBA range and the destination LBA range is not accessed to execute the LBA copy command. In certain examples, a LBA copy command can be executed without exchanging any of the underlying stored data with the host. In some examples, an LBA copy command can be executed via manipulation of only the L2P table and not reading or writing any of the underlying stored data.

Figure 5:
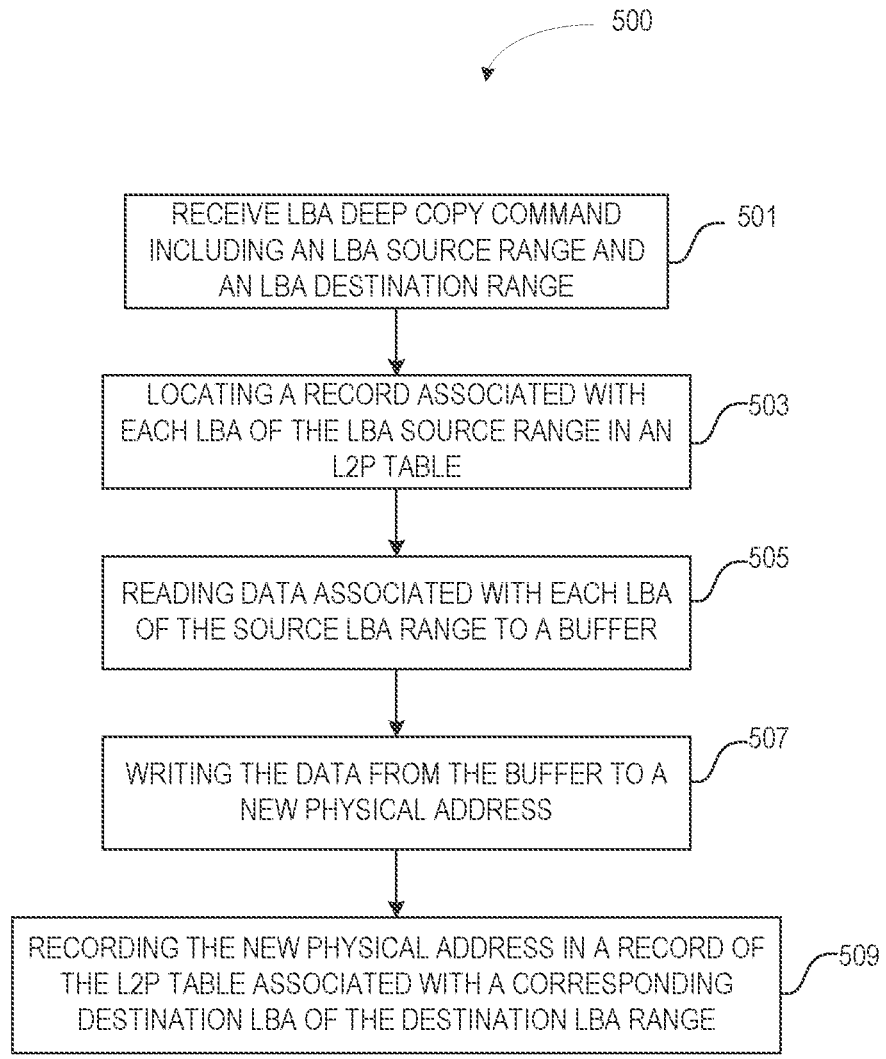
FIG. 5 illustrates generally a flowchart of an example method for operating a storage device in response to a LBA deep copy command.

FIG. 5 illustrates generally a flowchart of an example method 500 for executing a deep LBA copy command. At 501, a controller of the flash storage system can receive an LBA copy command from a host device. The LBA copy command can include one or more LBA ranges, such as a source LBA range and a destination LBA range. At 503, the flash storage system can locate one or more records of an L2P table of the flash storage system corresponding to one or more LBAs of the source LBA range. In certain examples, the flash storage system can also locate one or more records of the L2P table corresponding to one or more LBAs of the destination LBA range. At 505, the controller can read, such as by sensing and transferring, data associated with each LBA of the source LBA range to a buffer of the flash storage system. At 507, the controller can write or program that data to a physical address of the flash storage system. In certain examples, the physical address may or may not be the same physical address from which the data was read. At 509, the physical address can be recorded in a record of the L2P table corresponding to a destination LBA that corresponds to the source LBA. Upon completion of reading and writing all the data associated with the LBAs of the source LBA range, the controller can provide status information, such as an indication the copy command is complete, to the host. In certain examples, a LBA deep copy command can be executed without exchanging any of the underlying stored data with the host.

Figure 6:
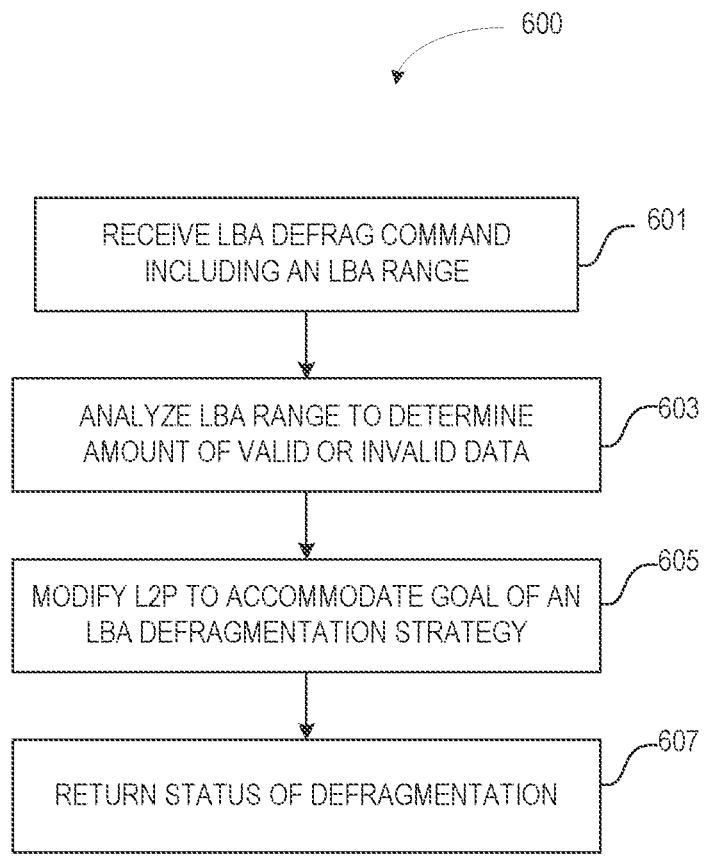
FIG. 6 illustrates generally a flowchart of an example method for operating a storage device in response to a LBA defragmentation command.

FIG. 6 illustrates generally a flowchart of an example method for execution of an LBA defragmentation command for flash memory. At 601, a LBA defragmentation command can be received at a controller of a flash memory system. The LBA defragmentation command can include an LBA range. At 603, the controller can begin to analyze the LBA range by locating records associated with each LBA of the LBA range within the L2P table and determining the amount of valid or invalid data associated with each LBA. At 605, either during or after analysis of each record of the LBA range, the controller can initiate a LBA move command to reallocate the LBAs of the range of LBAs to separate invalid data from valid and to compact the valid data closer to one end of the LBA range than the other. One method of defragmentation can seek to compact the valid data within LBAs at a first end of the LBA range to minimize LBAs at that first end with invalid data and to maximize free LBAs at the second end of the LBA range. A second method of defragmentation can seek to compact the valid data at one end of the LBA range but to also maintain related data in contiguous LBAs, which can improve performance because the L2P cache is more likely to contain mapping information for sequential host requests. Thus, as a result of a defragmentation exercise according to either the first or the second methods discussed above, the portion of the L2P table in the cache of either the host or the storage system can be updated less often. Less cache updating can translate into reducing overall latency of the system. In certain examples, a defrag command can be executed via manipulation of only the L2P table and not moving or copying the underlying stored data, and also without exchanging any of the underlying stored data with the host.

Figure 7:
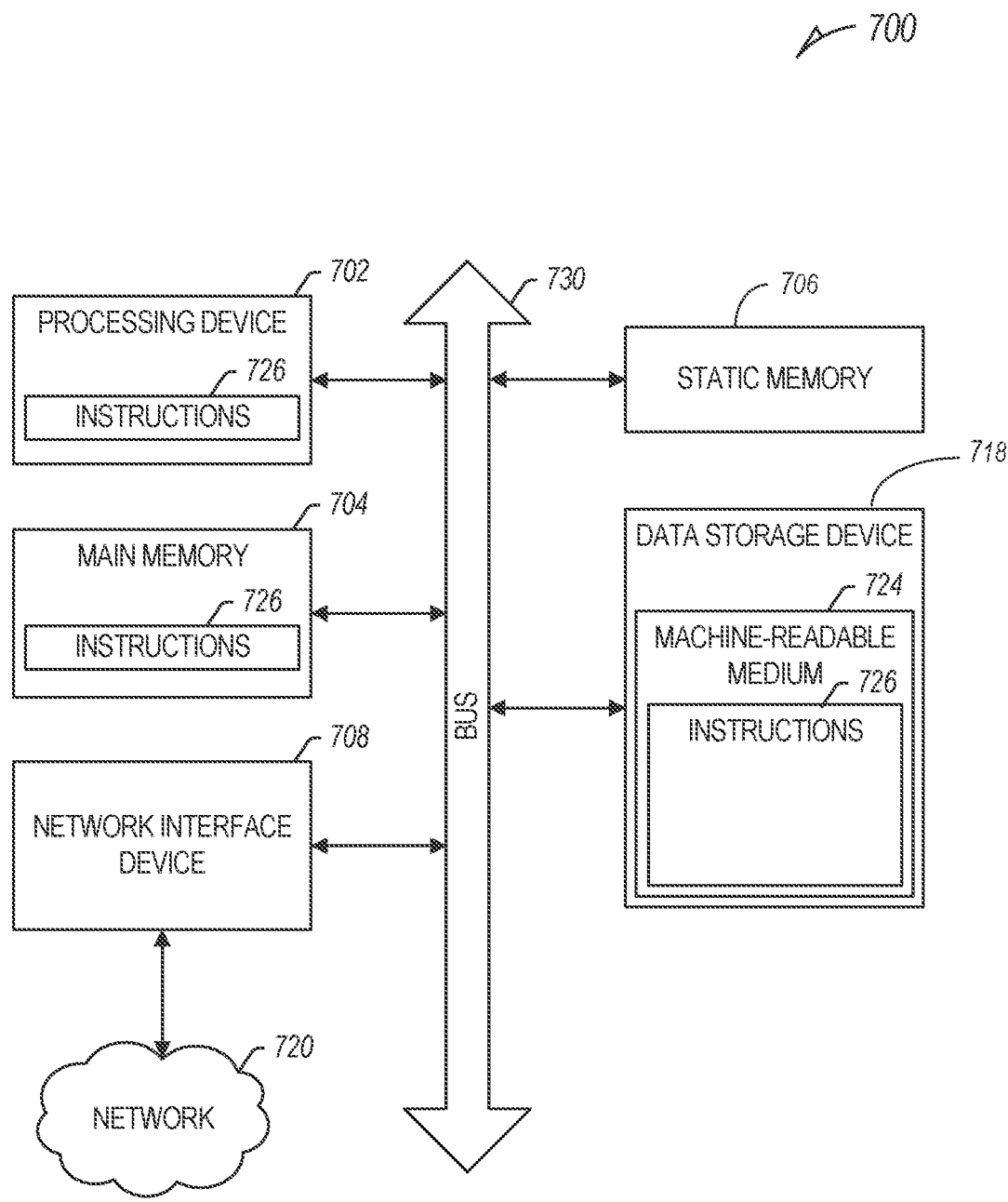
FIG. 7 illustrates a block diagram of an example machine upon which any one or more of the techniques (e.g., methodologies) discussed herein may perform.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 700 (e.g., the host 105, the memory device 110, etc.) may include a processing device 702 (e.g., a hardware processor, a central processing unit (CPU), a graphics processing unit (GPU), a hardware processor core, or any combination thereof, such as a memory controller of the memory device 110, etc.), a main memory 704 (e.g., read-only memory (ROM), flash memory, dynamic random-access memory (DRAM) such as synchronous DRAM (SDRAM) or Rambus DRAM (RDRAM), etc.), a static memory 706 (e.g., flash memory, static random-access memory (SRAM), etc.), and a data storage system 718, some or all of which may communicate with each other via an interlink (e.g., bus) 730.

The processing device 702 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 can be configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 or within the processing device 702 during execution thereof by the computer system 700, the main memory 704 and the processing device 702 also constituting machine-readable storage media. The machine-readable storage medium 724, the data storage system 718, or the main memory 704 can correspond to the memory device 110 of FIG. 1.

In one implementation, the instructions 726 include instructions to implement functionality corresponding to one or more LBA remap operations as discussed above. While the machine-readable storage medium 724 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 700 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 700 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 726 (e.g., software, programs, an operating system (OS), etc.) or other data are stored on the data storage device 718 can be accessed by the main memory 704 for use by the processing device 702. The main memory 704 (e.g., DRAM) is typically fast, but volatile, and thus a different type of storage than the data storage device 718 (e.g., an SSD), which is suitable for long-term storage, including while in an "off" condition. The instructions 726 or data in use by a user or the machine 700 are typically loaded in the main memory 704 for use by the processing device 702. When the main memory 704 is full, virtual space from the data storage device 718 can be allocated to supplement the main memory 704; however, because the data storage device 718 device is typically slower than the main memory 704, and write speeds are typically at least twice as slow as read speeds, use of virtual memory can greatly reduce user experience due to storage device latency (in contrast to the main memory 704, e.g., DRAM). Further, use of the data storage device 718 for virtual memory can greatly reduce the usable lifespan of the data storage device 718.

In contrast to virtual memory, virtual memory compression (e.g., the Linux™ kernel feature "ZRAM") uses part of the memory as compressed block storage to avoid paging to the data storage device 718. Paging takes place in the compressed block until it is necessary to write such data to the data storage device 718. Virtual memory compression increases the usable size of the main memory 704, while reducing wear on the data storage device 718.

Storage devices optimized for mobile electronic devices, or mobile storage, traditionally include MMC solid-state storage devices (e.g., micro Secure Digital (microSD™)

cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 724 may further be transmitted or received over a network 720 using a transmission medium via the network interface device 708 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 708 may include one or more physical jacks (e.g., Ethernet, coaxial, or phone jacks) or one or more antennas to connect to the network 720. In an example, the network interface device 708 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700, and includes digital or analog communications signals or other intangible medium to facilitate communication of such software.

ADDITIONAL NOTES AND EXAMPLES

Example 1 is a method comprising: receiving a logical block address (LBA) re-map request from a host device at a controller of a flash memory device, the LBA re-map request including an LBA range, and the LBA re-map request configured to associate a new LBA with data stored on the flash memory device; locating records associated with one or more LBAs of the LBA range in a logical-to-physical address map (L2P) table in response to the LBA re-map request; modifying each of the records to execute a portion of the LBA re-map request; and wherein execution of the LBA re-map request does not exchange the data stored on the flash memory device with the host device.

In Example 2, the subject matter of Example 1 includes, wherein receiving a LBA re-map request from a host device at a controller of a flash memory device includes: receiving a logical block address (LBA) move instruction at the controller of the flash memory device from the host device; and wherein the LBA range includes a source LBA range and a destination LBA range.

In Example 3, the subject matter of Example 2 includes, wherein locating a record associated with one or more LBAs of the LBA range in a logical-to-physical address map (L2P) table includes locating a record associated with each source LBA in the L2P table of the flash memory device.

In Example 4, the subject matter of Example 3 includes, wherein modifying each of the one or more records to execute a portion of the LBA re-map request includes setting an L2P record associated with each destination LBA of the destination LBA range to point to the data location associated with the corresponding source LBA of the source LBA range.

In Example 5, the subject matter of Example 4 includes, resetting each remaining L2P record associated with an LBA of the source LBA range to an unmapped state.

In Example 6, the subject matter of Examples 1-5 includes, wherein the receiving an LBA re-map request from a host device at a controller of a flash memory device includes: receiving an LBA copy command at the controller of the flash memory device from the host device; and wherein the LBA range includes a source LBA range and a destination LBA range.

In Example 7, the subject matter of Example 6 includes, wherein locating a record associated with one or more LBAs of the LBA range in a logical-to-physical address map (L2P) table includes locating a record associated with each source LBA in the L2P table of the flash memory device.

In Example 8, the subject matter of Example 7 includes, wherein, when the LBA copy command is a shallow LBA copy command, modifying each of the one or more records to execute a portion of the data movement command includes setting an L2P record associated with each destination LBA of the destination LBA range to point to the physical address associated with the corresponding source LBA of the source LBA range.

In Example 9, the subject matter of Examples 7-8 includes, wherein, when the LBA copy command is a deep LBA copy command, modifying each of the one or more records to execute a portion of the data movement command includes, for each LBA of the source LBA range: reading the data to an internal buffer of the flash memory device; writing the data from the internal buffer to a new physical address of the flash memory device; and recording the new physical address in a record of the L2P table associated with a corresponding destination LBA of the destination LBA range.

In Example 10, the subject matter of Examples 1-9 includes, wherein the receiving an LBA re-map request from a host device at a controller of a flash memory device includes: receiving a defragmentation command at the controller of the flash memory device from the host device, the defragmentation command including an LBA range; analyzing the data at the physical addresses of the flash memory associated with each LBA of the LBA range to determine an amount of valid data; and modifying the L2P table to reallocate the valid data toward one end of the LBA range.

Example 11 is a flash memory system comprising: flash memory configured to store data of a host device; a flash memory control circuit configured to interface to the host device and to the flash memory; and a logical-to-physical (L2P) table configured to map physical addresses of the flash memory with logical block addresses (LBAs) of the host device; wherein the flash memory control circuit is configured to: receive a LBA re-map request from the host device and to associate a new LBA with the data stored on the flash memory, the LBA re-map including an LBA range; locate records associated with one or more LBAs of the LBA range in the L2P table in response to the LBA re-map request; and modify each of the records to execute a portion of the LBA re-map request; and wherein execution of the LBA re-map request does not exchange the data stored on the flash memory device with the host device.

In Example 12, the subject matter of Example 11 includes, wherein the LBA re-map request is an LBA move command; and wherein the LBA range includes a source LBA range and a destination LBA range.

In Example 13, the subject matter of Example 12 includes, wherein the records are records associated with each source LBA of the source LBA range.

In Example 14, the subject matter of Example 13 includes, wherein the flash memory control circuit is configured to set an L2P record associated with each destination LBA of the destination LBA range to point to a physical address associated with the corresponding source LBA of the source LBA range in response to the LBA move command.

In Example 15, the subject matter of Example 14 includes, wherein the flash memory control circuit is configured to reset each L2P record associated with an LBA of the source LBA range to an unmapped state.

In Example 16, the subject matter of Examples 11-15 includes, wherein the LBA re-map request is a LBA copy command; wherein the LBA range includes a source LBA range and a destination LBA range; wherein the records are records associated with each source LBA of the source LBA range; and wherein the flash memory control circuit is configured to set an L2P record associated with each destination LBA of the destination LBA range to point to a physical address associated with the corresponding source LBA of the source LBA range in response to the LBA copy command.

In Example 17, the subject matter of Examples 11-16 includes, wherein the LBA re-map request is an LBA deep copy command; wherein the LBA range includes a source LBA range and a destination LBA range; wherein the records are records associated with each source LBA of the source LBA range; and wherein the flash memory control circuit is configured to: read the data for associated with each source LBA of the source LBA range from a physical address of the flash memory associated with each source LBA to an internal buffer of the flash memory; write the data from the internal buffer to a new physical address of the flash memory device; and record the new physical address in a record of the L2P table associated with a corresponding destination LBA of the destination LBA range.

In Example 18, the subject matter of Examples 11-17 includes, wherein the LBA re-map request is an LBA defragmentation command; and wherein the flash memory control circuit is configured to: analyze the data at the physical addresses of the flash memory associated with each LBA of the LBA range to determine an amount of valid data; and modify the L2P table to reallocate the valid data toward one end of the LBA range.

Example 19 is a machine-readable medium, comprising instructions, which when executed by a processor of a flash memory device, cause the processor to perform operations comprising: receiving a logical block address (LBA) re-map request from a host device at a controller of a flash memory device, the LBA command including an LBA range, and the LBA re-map request configured to associate a new LBA with data stored on the flash memory device; locating records associated with one or more LBAs of the LBA range in a logical-to-physical address map (L2P) table in response to the LBA re-map request; modifying each of the records to execute a portion of the LBA re-map request; and wherein execution of the LBA re-map request does not exchange the data stored on the flash memory device with the host device.

In Example 20, the subject matter of Example 19 includes, wherein the LBA re-map request is a LBA copy command; wherein the LBA range includes a source LBA range and a destination LBA range; wherein the records are records associated with each source LBA of the source LBA range; and wherein the operations of modifying each of the records includes setting an L2P record associated with each destination LBA of the destination LBA range to point to a physical address associated with the corresponding source LBA of the source LBA range.

In Example 21, the subject matter of Examples 19-20 includes, wherein the LBA re-map request is a LBA move command; wherein the LBA range includes a source LBA range and a destination LBA range; wherein the records are records associated with each source LBA of the source LBA range; and wherein the operations of modifying each of the records includes: setting an L2P record associated with each destination LBA of the destination LBA range to point to a physical address associated with the corresponding source LBA of the source LBA range; and resetting each L2P record associated with an LBA of the source LBA range to an unmapped state.

In Example 22, the subject matter of Examples 19-21 includes, wherein the LBA re-map request is a LBA deep copy command; wherein the LBA range includes a source LBA range and a destination LBA range; wherein the records are records associated with each source LBA of the source LBA range; and wherein the operations of modifying each of the records includes, for each LBA of the source LBA range: reading data associated with the source LBA from a physical address of the flash memory to an internal buffer of the flash memory; writing the data from the internal buffer to a new physical address of the flash memory; and recording the new physical address in a record of the L2P table associated with a corresponding destination LBA of the destination LBA range.

In Example 23, the subject matter of Examples 19-22 includes, wherein the LBA re-map request is an LBA defragmentation command; and wherein the operations include: analyzing the data at the physical addresses of the flash memory associated with each LBA of the LBA range to determine an amount of valid data; and modifying the L2P table to reallocate the valid data toward one end of the LBA range.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method comprising:
   receiving a logical block address (LBA) move request from a host device at a controller of a flash memory device, the LBA move request including an LBA range, the LBA range including a source LBA range and a destination LBA range;
   locating each record associated with one or more LBAs of the source LBA range in a logical-to-physical address map (L2P) table in response to the LBA move request;
   setting an L2P record associated with each destination LBA of the destination LBA range to point to a physical location associated with a corresponding source LBA record of the source LBA range;
   resetting each record associated with one or more LBAs of the source LBA range to an unmapped state; and
   wherein execution of the LBA move request does not exchange data stored on the flash memory device with the host device.

2. The method of claim 1, further comprising:
   receiving an LBA copy command at the controller of the flash memory device from the host device, the LBA copy command including an LBA range, wherein the LBA range of the LBA copy command includes a source LBA range and a destination LBA range;
   locating records associated with one or more LBAs of the source LBA range of the LBA copy command in the logical-to-physical address map (L2P) table in response to the LBA copy command;
   modifying each of the records associated with one or more LBAs of the source LBA range of the LBA copy command to execute a portion of the LBA copy command; and
   wherein execution of the LBA copy command does not exchange data stored on the flash memory device with the host device.

3. The method of claim 2, wherein, when the LBA copy command is a shallow LBA copy command, and wherein modifying each of the records associated with the one or more LBAs of the source LBA range of the LBA copy command to execute a portion of the LBA copy command includes setting an L2P record associated with each destination LBA of the destination LBA range of the LBA copy command to point to a physical address associated with the corresponding source LBA of the source LBA range of the LBA copy command.

4. The method of claim 2, wherein, when the LBA copy command is a deep LBA copy command, and wherein modifying each of the records associated with the one or more LBAs of the source LBA range of the LBA copy command to execute a portion of the LBA copy command includes, for each particular LBA of the source LBA range of the LBA copy command:
  reading data at a physical location of a flash memory device indicated by the particular LBA to an internal buffer of the flash memory device;
  writing the data from the internal buffer to a new physical address of the flash memory device; and
  recording the new physical address in a record of the L2P table associated with a corresponding destination LBA of the destination LBA range of the LBA copy command.

5. The method of claim 1, wherein the method further comprises:
  receiving a defragmentation command at the controller of the flash memory device from the host device, the defragmentation command including an LBA range;
  analyzing data at physical addresses of a flash memory of the flash memory device that are associated with each LBA of the LBA range of the defragmentation command to determine an amount of valid data; and
  modifying the L2P table to reallocate the valid data toward one end of the LBA range of the defragmentation command.

6. A flash memory system comprising:
  flash memory configured to store data of a host device;
  a flash memory control circuit configured to interface to the host device and to the flash memory; and
  a logical-to-physical (L2P) table configured to map physical addresses of the flash memory with logical block addresses (LBAs) of the host device;
  wherein the flash memory control circuit is configured to:
  receive a logical block address (LBA) move request from a host device at a controller of a flash memory device, the LBA move request including an LBA range, the LBA range including a source LBA range and a destination LBA range;
  locate each record associated with one or more LBAs of the source LBA range in a logical-to-physical address map (L2P) table in response to the LBA move request;
  set an L2P record associated with each destination LBA of the destination LBA range to point to a physical location associated with a corresponding source LBA record of the source LBA range;
  reset each record associated with one or more LBAs of the source LBA range to an unmapped state; and
  wherein execution of the LBA move request does not exchange data stored on the flash memory device with the host device.

7. The flash memory system of claim 6, wherein the flash memory control circuit is further configured to:
  receive an LBA copy command at the controller of the flash memory device from the host device, the LBA copy command including an LBA range, wherein the LBA range of the LBA copy command includes a source LBA range and a destination LBA range;
  locating records associated with one or more LBAs of the source LBA range of the LBA copy command in the logical-to-physical address map (L2P) table in response to the LBA copy command;
  modifying each of the records associated with one or more LBAs of the source LBA range of the LBA copy command to execute a portion of the LBA copy command; and
  wherein execution of the LBA copy command does not exchange data stored on the flash memory device with the host device.

8. The flash memory system of claim 7, wherein the LBA copy command is an LBA deep copy command; and
  wherein the flash memory control circuit is further configured to:
  for each particular LBA of the source LBA range of the LBA copy command:
  read data at a physical location of a flash memory device indicated by the particular LBA to an internal buffer of the flash memory;
  write the data from the internal buffer to a new physical address of the flash memory device; and
  record the new physical address in a record of the L2P table associated with a corresponding destination LBA of the destination LBA range of the LBA copy command.

9. The flash memory system of claim 6, wherein the flash memory control circuit is further configured to:
  receive an LBA defragmentation command;
  analyze data at physical addresses of the flash memory associated with each LBA of the LBA range of the LBA defragmentation command to determine an amount of valid data; and
  modify the L2P table to reallocate the valid data toward one end of the LBA range of the LBA defragmentation command.

10. A non-transitory machine-readable medium, comprising instructions, which when executed by a processor of a flash memory device, cause the processor to perform operations comprising:
  receiving a logical block address (LBA) move request from a host device at a controller of a flash memory device, the LBA move request including an LBA range, the LBA range including a source LBA range and a destination LBA range;
  locating each record associated with one or more LBAs of the source LBA range in a logical-to-physical address map (L2P) table in response to the LBA move request;
  setting an L2P record associated with each destination LBA of the destination LBA range to point to a physical location associated with a corresponding source LBA record of the source LBA range;
  resetting each record associated with one or more LBAs of the source LBA range to an unmapped state; and
  wherein execution of the LBA move request does not exchange data stored on the flash memory device with the host device.

11. The non-transitory machine-readable medium of claim 10, wherein the operations further comprise:
  receiving an LBA copy command at the controller of the flash memory device from the host device, the LBA copy command including an LBA range, wherein the LBA range of the LBA copy command includes a source LBA range and a destination LBA range;
  locating records associated with one or more LBAs of the source LBA range of the LBA copy command in the logical-to-physical address map (L2P) table in response to the LBA copy command;

modifying each of the records associated with one or more LBAs of the source LBA range of the LBA copy command to execute a portion of the LBA copy command; and wherein execution of the LBA copy command does not exchange data stored on the flash memory device with the host device.

12. The non-transitory machine-readable medium of claim 11, wherein, the LBA copy command is a deep LBA copy command, and wherein the operations of modifying each of the records associated with the one or more LBAs of the source LBA range of the LBA copy command to execute a portion of the LBA copy command includes, for each particular LBA of the source LBA range of the LBA copy command:

reading data at a physical location of a flash memory device indicated by the particular LBA to an internal buffer of the flash memory device;

writing the data from the internal buffer to a new physical address of the flash memory device; and recording the new physical address in a record of the L2P table associated with a corresponding destination LBA of the destination LBA range of the LBA copy command.

13. The non-transitory machine-readable medium of claim 10, wherein the operations further comprise:

receiving a defragmentation command at the controller of the flash memory device from the host device, the defragmentation command including an LBA range;

analyzing data at a physical addresses of flash memory of the flash memory device that is associated with each LBA of the LBA range of the defragmentation command to determine an amount of valid data; and modifying the L2P table to reallocate the valid data toward one end of the LBA range of the defragmentation command.

* * * * *